United States Patent

Choma et al.

Patent Number: 5,307,784
Date of Patent: May 3, 1994

[54] INDUCTION SYSTEM FOR INTERNAL COMBUSTION ENGINE

[75] Inventors: Michael A. Choma, Dearborn Heights; William F. Stockhausen, Northville; Timo A. Wiemero, Canton, all of Mich.

[73] Assignee: Ford Motor Company, Dearborn, Mich.

[21] Appl. No.: 42,915

[22] Filed: Apr. 5, 1993

[51] Int. Cl.⁵ .............................. F02B 47/08
[52] U.S. Cl. .................... 123/568; 123/572
[58] Field of Search .................. 123/568, 572

[56] References Cited

U.S. PATENT DOCUMENTS

| | | | |
|---|---|---|---|
| 4,342,300 | 8/1982 | Matthes | 123/568 |
| 4,354,463 | 10/1982 | Otani et al. | 123/568 |
| 4,453,502 | 6/1984 | Resler, Jr. | 123/568 |
| 4,492,209 | 1/1985 | Otani et al. | 123/568 |
| 4,672,939 | 6/1987 | Yokoi et al. | 123/568 |
| 4,693,226 | 9/1987 | Choma | 123/568 |
| 4,732,118 | 3/1988 | Tanahashi et al. | 123/568 |
| 4,811,697 | 3/1989 | Kurahashi | 123/568 |
| 4,829,958 | 5/1989 | Duret | 123/568 |
| 4,854,291 | 8/1989 | Eisbett et al. | 123/568 |
| 4,875,455 | 10/1989 | Hashimoto et al. | 123/568 |
| 4,924,840 | 5/1990 | Wade | 123/568 |
| 5,027,783 | 7/1991 | Von Reisen | 123/572 |
| 5,243,950 | 9/1993 | Dalupan | 123/572 |

*Primary Examiner*—Raymond A. Nelli
*Attorney, Agent, or Firm*—Jerome R. Drouillard; Roger L. May

[57] ABSTRACT

An induction system for a multicylinder reciprocating internal combustion engine includes cylinder 8, cylinder head 10 having at least one intake poppet valve 12, and at least one exhaust poppet valve 14, with the induction system further including a crankcase ventilation system 26 for conducting gases from the crankcase of the engine to the cylinder head, and a PCV passage for introducing crankcase gases directly into at least one of the engine's intake ports 18. In the case wherein multiple intake valves and ports are used, PCV flow may be introduced through one port, with recirculated exhaust gas being introduced through a second intake port.

23 Claims, 4 Drawing Sheets

INDUCTION SYSTEM FOR INTERNAL COMBUSTION ENGINE

BACKGROUND OF THE INVENTION

This invention relates to the introduction of crankcase gases and recirculated exhaust gases into the intake system of an internal combustion engine. It has been determined that the combination of crankcase gases from a positive crankcase ventilation system ("PCV") with recirculated exhaust gases from an exhaust gas recirculation ("EGR") system will result in the formation of carbonaceous sludge-like material if the PCV and EGR flows are combined at or near a throttle body positioned well upstream from intake ports extending through the cylinder head. The present invention prevents this sludging problem by combining the EGR and PCV flows only in the intake port. In this manner, the EGR and PCV combined flow will have little residence time either outside or inside the combustion chamber, and in the likely event that mixing between the PCV and EGR flows occurs in the intake port, the formation of sludge or carbonaceous material will be greatly reduced, if not eliminated entirely. Although it is known to introduce EGR flow upstream of the cylinder head ports through the use of a spacer introduced between the intake manifold and cylinder head, such a system requires additional components and provides additional potential vacuum leak paths. The present system, by introducing EGR and PCV gases directly into the intake ports of an engine, serves to prevent the buildup of induction-borne sludge, without creating the potential vacuum leak paths found with the systems of the prior art.

SUMMARY OF THE INVENTION

An induction system for a crankcase equipped multicylinder reciprocating internal combustion engine according to the present invention includes a cylinder head having at least one intake poppet valve and at least one exhaust poppet valve, with each of the intake valves being situated within an intake port extending through the cylinder head. A system according to the present invention further includes a crankcase ventilation system for conducting gases from the crankcase of the engine to the cylinder head and means located within the cylinder head and connected with the crankcase ventilation system for introducing the crankcase gases directly into at least one of the intake ports. The means for introducing crankcase gases directly into the intake port may comprise a PCV passage extending into the intake port at the location of the intake valve. A system according to the present invention may further comprise an exhaust gas recirculation means for recirculating a portion of the engine's exhaust directly into at least one of the intake ports within a cylinder head. A system according to the present invention may be applied to an engine having two or more intake poppet valves. In such case, crankcase gases may be introduced into one of the intake ports of a cylinder with the recirculated exhaust gases being directly introduced into an intake port which does not have means for introducing the crankcase gases. In other words, the PCV and EGR flows may be introduced into the same cylinder via different intake ports.

Figure 1:
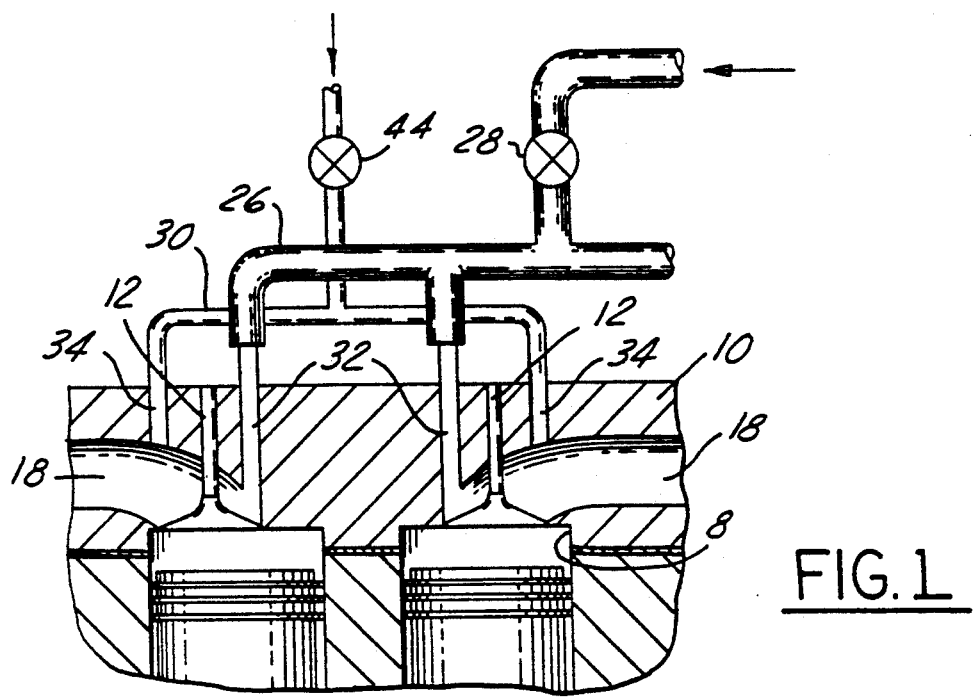
FIG. 1 is a partially schematic representation of an engine according to the present invention including PCV and EGR systems.

Although the details of the EGR and PCV supply systems are shown in FIG. 1 are not provided in FIGS. 3 and 5-10 for the sake of economy, it should be understood that the such systems would be provided in an engine according to the present invention.

DETAILED DESCRIPTION OF THE PREFERRED EMBODIMENTS

As shown in FIG. 1, an internal combustion engine having cylinder 8 and cylinder head 10 and intake poppet valves 12 situated in intake ports 18 within cylinder head 10, is supplied with gases conducted from the crankcase of the engine via PCV system 26, which includes PCV valve 28 and PCV passage 32. The engine's combustion system is supplied with recirculated exhaust via EGR system 30, including EGR passage 34, with the flow being controlled by EGR valve 44. The flow of exhaust from cylinder 8 is controlled by exhaust valve 14, which allows flow into exhaust port 16.

Figure 2:
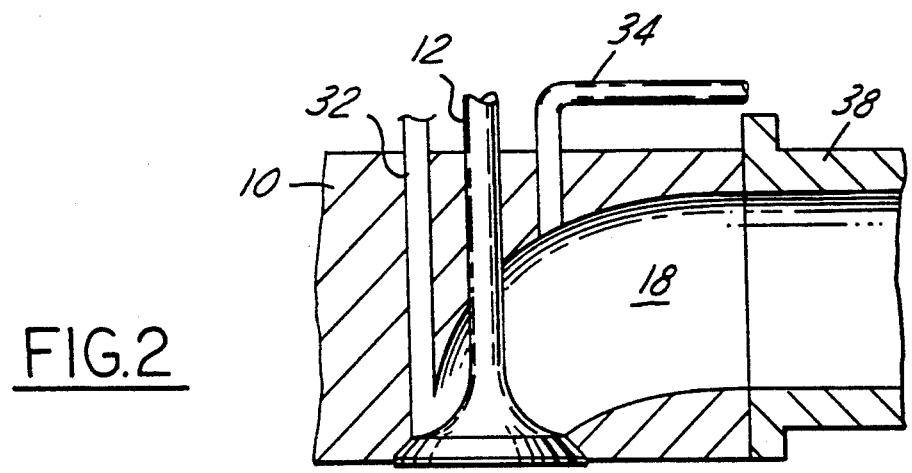
FIG. 2 is an enlarged portion of an engine according to FIG. 1.

As shown in enlarged detail in FIG. 2, the flow from PCV system 26 is introduced directly into intake port 18 by means of PCV passage 32, which extends into intake port 18 at the location of intake valve 12. Note from FIG. 2 that PCV passage 32 may comprise a drilling extending through cylinder head 10 and having a discharge point near the throat of intake valve 12. In similar fashion, EGR enters intake port 18 directly by means of EGR passage 34 which, too, could comprise a drilling into cylinder head 10 and into intake port 18. It has been determined that the total cross-sectional area of passages 32 and 34 should not exceed approximately 4% of the total area of intake port 18, as measured at the interface between cylinder head 10 and intake manifold 38. As described in connection with the other Figures, intake manifold 38 may include a runner control valve in some embodiments according to the present invention.

Figure 3:
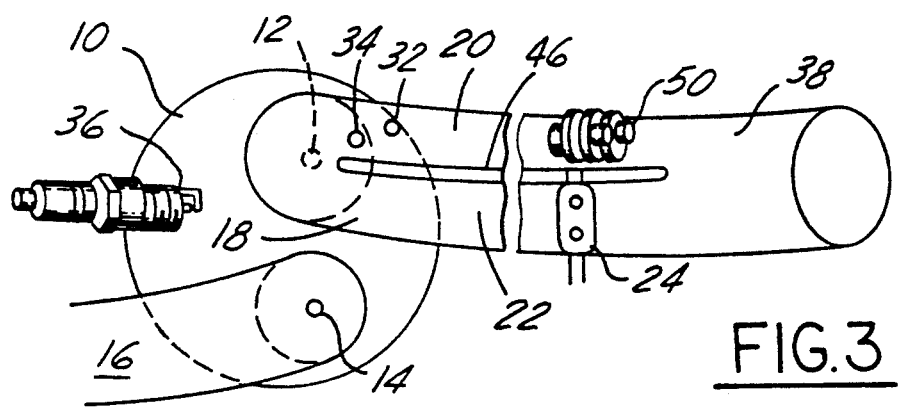
FIG. 3 illustrates one type of placement of the PCV and EGR passages in an engine according to the present invention, with a single intake valve and a divided intake port having an airflow control valve situated therein.

FIG. 3 illustrates an embodiment according to the present invention in which the present induction system is applied to an engine having dividing wall 46 extending along intake port 18 generally longitudinally and vertically, so as to define low speed port 20 and high speed port 22. PCV passage 32 and EGR passage 34 are both located near the innermost point of low speed port 20. Fuel injector 50 is located within intake manifold 38 such that injector 50 discharges into low speed runner 20. Notice also that the embodiment of FIG. 3 includes runner control valve 24, which selectively occludes high speed port 22. Those skilled in the art will appreciate that control valve 24 could be operated by an electronic engine controller according to any one of several known control algorithms. The details of such a control algorithm are beyond the scope of the present invention.

Figure 4:
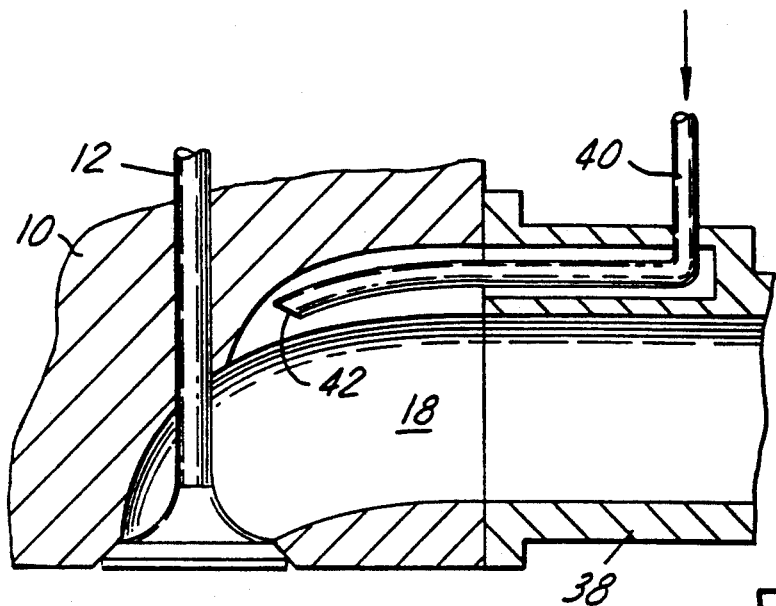
FIG. 4 is a sectional view illustrating an alternative structure for introducing either EGR or PCV into an intake port according to the present invention.

FIG. 4 illustrates another embodiment of the present invention in which either EGR or PCV gases are introduced directly into intake port 18 by means of nozzle 40, which extends along intake port 18 and which has a discharge opening 42 located adjacent intake valve 12.

Figure 5:
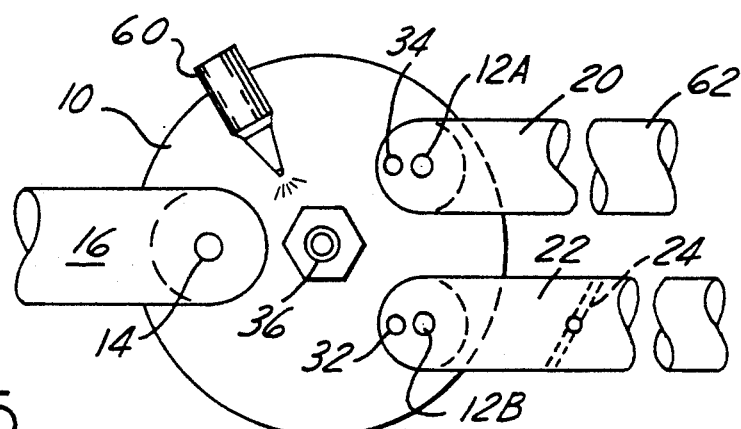
FIG. 5 is an illustration of a second embodiment of an engine according to the present invention, in which the EGR and PCV gases are supplied through separate intake ports in an engine having direct cylinder fuel injection and a valve for controlling airflow through a high speed port.

FIG. 5 illustrates an embodiment of the present invention in which an induction system includes low-speed ports 20 fed by primary runners 62 (one of each is shown), and high-speed ports 22, fed by secondary runners 64 (one of each is shown). The low speed ports are used during all modes of engine operation, whereas the high speed ports are used only during high power operation.

In the embodiment of FIG. 5, EGR passage 34 is located so as to introduce recirculated exhaust gas directly into low-speed port 20 in the vicinity of intake valve 12A. Conversely, PCV passage 32 is situated so as to introduce crankcase gases directly into high speed port 22 in the vicinity of intake valve 12B. In this manner, the problem of sludging or build-up of carbonaceous material due to premature combination of the PCV and EGR flows within the intake manifold will be eliminated because there will be no combination of flows except in the engine's cylinders. The cylinder configuration illustrated in FIG. 5 further includes a centrally located sparkplug 36, and an exhaust port 16 having exhaust valve 14. Fuel injector 60 discharges directly into the cylinder.

Those skilled in the art will appreciate in view of this disclosure that other configurations could be used according to the present invention, including those having more than two intake valves and two or more exhaust valves.

Figure 6:
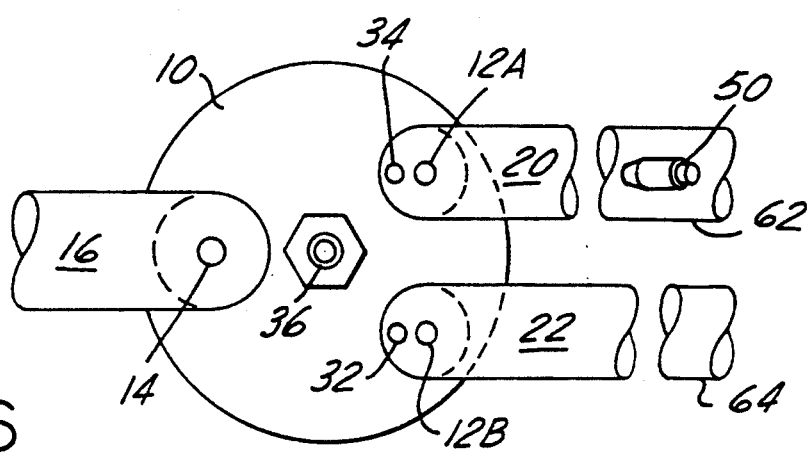
FIG. 6 is an illustration of a third embodiment of an engine according to the present invention, in which the EGR and PCV gases are supplied through separate intake ports in an engine having port fuel injection and an uncontrolled high speed port. As used herein, "uncontrolled" means that the port or runner is not equipped with a secondary airflow control valve, it being understood that at least one conventional primary throttle valve (not shown) will be used to govern the air flowing into the various ports.
Figure 8:
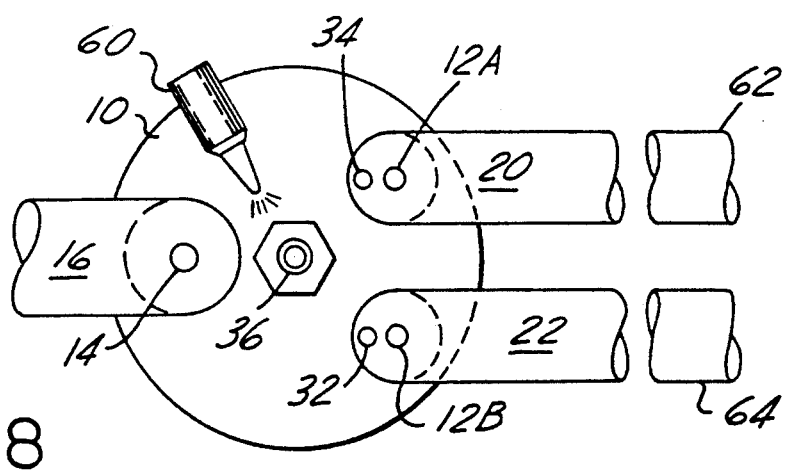
FIG. 8 is an illustration of a fifth embodiment of an engine according to the present invention, in which the EGR and PCV gases are supplied through separate intake ports in an engine having direct cylinder fuel injection and an uncontrolled high speed port.

In the embodiments of FIGS. 6 and 8, air flows through high speed ports 22 and secondary runners 64 unimpeded by a runner control valve. In both embodiments, EGR is introduced by EGR passage 34 into pows speed port 20, with PCV being introduced by PCV passage 32 into high speed port 22. The EGR and PCV gases are supplied in the manner shown in FIG. 1. In the embodiment of FIG. 6, fuel is supplied via fuel injector 50, which is mounted in primary runner 62, so as to discharge into low speed port 20. In the embodiment of FIG. 8, fuel is supplied via fuel injector 60, which is mounted in the cylinder head, so as to discharge directly into the cylinder.

Figure 7:
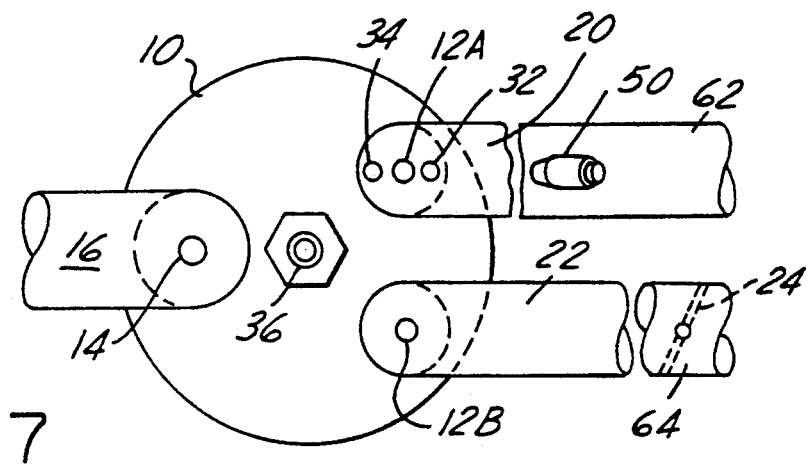
FIG. 7 is an illustration of a fourth embodiment of a multiport engine according to the present invention, in which the EGR and PCV gases are supplied through a common intake port in an engine having port fuel injection and a secondary valve for controlling airflow through the high speed port.

In the embodiment of FIG. 7, airflow through high speed ports 22 and secondary runners 64 is controlled by runner valve 24. Contrary to the other multiple intake port embodiments, both EGR passage 34 and PCV passage 32 discharge directly into a common intake port, namely low speed port 20. Fuel is supplied via fuel injector 50, which is mounted in primary runner 62, so as to discharge into low speed port 20. With an engine having multiple intake valves and controlled airflow in one or more intake runners, such as the engine of FIG. 7, it is preferable to discharge both EGR and PCV gases into ports which are washed down by fuel spraying from injector 50. The fuel spray acts along with the port introduction of EGR and PCV to eliminate deposit formation in the intake ports.

Figure 9:
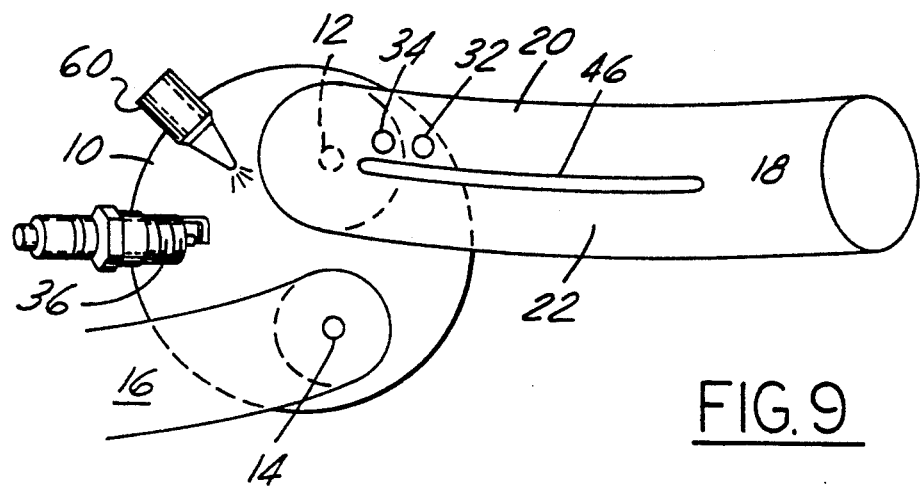
FIG. 9 is an illustration of a sixth embodiment of an engine according to the present invention, in which the EGR and PCV gases are supplied through a low speed intake port in an engine having a single intake valve, direct cylinder fuel injection, and an uncontrolled high speed port.

In the embodiment of FIG. 9, EGR and PCV gases are plumbed via EGR passage 34 and PCV passage 32 into low speed intake port 20 in an engine having a single intake valve 12 and direct cylinder fuel injection by means of injector 60. Notice that high speed port 22 is uncontrolled. As with the embodiment of FIG. 3, the low and high speed ports are defined by dividing wall 46. As an alternative to the configuration of FIG. 9, dividing wall 46 could be eliminated.

Figure 10:
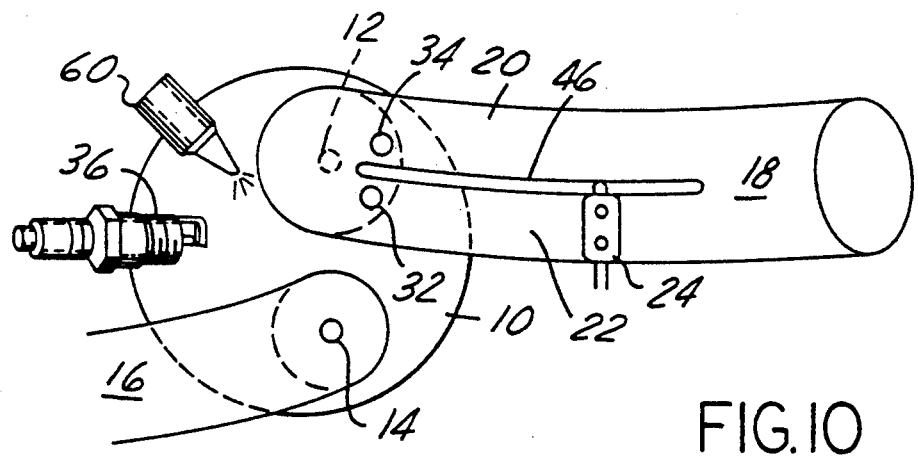
FIG. 10 is an illustration of a seventh embodiment of an engine according to the present invention, in which the EGR gases are supplied through a low speed intake port in an engine having a single intake valve, direct cylinder fuel injection, and a controlled high speed port. The PCV gases are introduced through the high speed port.

In the embodiment of FIG. 10, EGR passage 34 supplies EGR gases to low speed intake port 20 in an engine having a single intake valve 12 and direct cylinder fuel injection from injector 60. As with the embodiments of FIGS. 3 and 9, the low and high speed ports are defined by dividing wall 46. And, as with FIG. 3, the high speed runner is controlled. Unlike the embodiment of FIG. 9, high speed port 22 is controlled. PCV gases are introduced through the high speed port via PCV passage 32.

We claim:

1. An induction system for a multicylinder reciprocating internal combustion engine having a crankcase and an intake manifold, with each of said cylinders comprising:

a cylinder head having at least one intake poppet valve and at least one exhaust poppet valve, with each of said intake valves being situated within an intake port extending through the cylinder head;

a crankcase ventilation system for conducting gases from the crankcase of the engine to the cylinder head; and means located within the cylinder head, and connected with said crankcase ventilation system, for introducing said crankcase gases directly into at least one of said intake ports.

2. An induction system according to claim 1, wherein said means for introducing crankcase gases directly into said at least one intake port comprises a PCV passage extending into said intake port at the location of said intake valve, with said PCV passage being supplied with crankcase gases by said crankcase ventilation system.

3. An induction system according to claim 2, wherein said PCV passage comprises a drilling extending through said cylinder head and having a discharge point near the throat of said intake valve.

4. An induction system according to claim 2, wherein said PCV passage comprises a nozzle extending along said intake port and having a discharge opening located adjacent said intake valve.

5. An induction system according to claim 1, wherein said cylinder head has one intake valve per cylinder, and each of the intake ports has a dividing wall extending along said port generally longitudinally so as to define low and high speed ports, with said induction system further comprising a fuel injector mounted within the intake manifold so as to discharge into the low speed port, and exhaust gas recirculation means for recirculating a portion of the engine exhaust gases and for introducing recirculated exhaust gases into the combustion process, with both the crankcase gases and the recirculated exhaust gases being introduced directly into said low speed port.

6. An induction system according to claim 5, further comprising a runner control valve situated within said high speed port so as to selectively occlude the high speed port.

7. An induction system according to claim 1, further comprising exhaust gas recirculation means for recirculating a portion of the engine exhaust gases into the combustion process and for introducing recirculated exhaust gases directly into at least one of said intake ports within said cylinder head.

8. An induction system according to claim 7, wherein said means for introducing recirculated exhaust gases directly into said intake port comprises a passage extending into said intake port adjacent the location of said intake valve, with said passage being supplied with recirculated exhaust gas.

9. An induction system according to claim 7, wherein said means for introducing crankcase gases and recirculated exhaust gases into the intake ports comprise passages which have a total cross sectional area which does not exceed approximately four percent of the total intake port area of each cylinder, taken at the interface of said cylinder head and said intake manifold.

10. An induction system according to claim 1, wherein said cylinder head has one intake valve per cylinder, and each of the intake ports has a dividing wall extending along said port generally longitudinally so as to define low and high speed ports, with said induction system further comprising a fuel injector mounted within the cylinder head so as to discharge directly into the cylinder, and exhaust gas recirculation means for recirculating a portion of the engine exhaust gases and for introducing recirculated exhaust gases into the combustion process, with both the crankcase gases and the recirculated exhaust gases being introduced directly into said low speed port.

11. An induction system according to claim 10, wherein both the crankcase gases and the recirculated exhaust gases are introduced directly into said low speed port.

12. An induction system according to claim 10, wherein the recirculated exhaust gases are introduced directly into said low speed port, and the crankcase gases are introduced directly into said high speed port, which is provided with an airflow control valve.

13. An induction system according to claim 1, further comprising a fuel injector mounted in said cylinder head so as to discharge directly into the engine cylinder.

14. An induction system for a multicylinder reciprocating internal combustion engine having a crankcase, with each of said cylinders comprising:
  a cylinder head supplied with induction air by an intake manifold, with said cylinder head having at least two intake poppet valves and at least one exhaust poppet valve, with each of said intake valves being situated within a separate intake port extending through the cylinder head;
  a crankcase ventilation system for conducting gases from the crankcase of the engine to the cylinder head;
  means located within the cylinder head and connected with said crankcase ventilation system, for introducing said crankcase gases directly into at least one of said intake ports within said cylinder head;
  an exhaust gas recirculation system for recirculating a portion of the engine exhaust gases to the cylinder head; and
  means located within the cylinder head for introducing the recirculated exhaust gases directly into an intake port which is not equipped with said means for introducing crankcase gases.

15. An induction system according to claim 14, wherein said intake ports include low speed ports, fed by primary runners, with said low speed ports being used during all modes of engine operation, and high speed ports, fed by secondary runners, with said high speed ports being used during high power operation, with said crankcase gases being introduced into said high speed ports and with said recirculated exhaust gases being introduced into said low speed ports.

16. An induction system according to claim 15, further comprising a fuel injector mounted in said cylinder head so as to discharge directly into the engine cylinder.

17. An induction system according to claim 15, further comprising a runner control valve, mounted within said secondary runner, so as to selectively occlude the secondary runner.

18. An induction system according to claim 14, wherein said intake ports include low speed ports, fed by primary runners, and high speed ports, fed by secondary runners, with said crankcase gases being introduced into said high speed ports and with said recirculated exhaust gases being introduced into said low speed ports.

19. An induction system according to claim 18, further comprising a fuel injector mounted in said primary runner so as to discharge into the low speed port.

20. An induction system according to claim 18, further comprising a fuel injector mounted in said cylinder head so as to discharge directly into the engine cylinder.

21. An induction system for a multicylinder reciprocating internal combustion engine having a crankcase, with each of said cylinders comprising:
  a cylinder head supplied with induction air by an intake manifold, with said cylinder head having at least two intake poppet valves and at least one exhaust poppet valve, with each of said intake valves being situated within a separate intake port extending through the cylinder head, wherein said intake ports include low speed ports, fed by primary runners, with said low speed ports being used during all modes of engine operation, and high speed ports, fed by secondary runners, with said high speed ports being used during high power operation;

a crankcase ventilation system for conducting gases from the crankcase of the engine to the cylinder head;

an exhaust gas recirculation system for recirculating a portion of the engine exhaust gases to the cylinder head; and means located within the cylinder head and connected with said crankcase ventilation system and said exhaust gas recirculation system, for introducing said crankcase gases directly into a common intake port within said cylinder head.

22. An induction system according to claim 21, further comprising a runner control valve, mounted within said secondary runner, so as to selectively occlude the secondary runner.

23. An induction system according to claim 21, further comprising a fuel injector mounted in said primary runner so as to discharge into the low speed port.

* * * * *